(12) United States Patent
Lim et al.

(10) Patent No.: US 8,539,268 B2
(45) Date of Patent: Sep. 17, 2013

(54) APPARATUS AND METHOD FOR CONTROLLING CURRENT CONSUMPTION IN A MULTI MODEM SYSTEM

(75) Inventors: In-Chun Lim, Hwaseong-si (KR); Byung-Tae Kang, Seoul (KR); Jin-Woo Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 12/617,088

(22) Filed: Nov. 12, 2009

(65) Prior Publication Data

US 2010/0122099 A1     May 13, 2010

(30) Foreign Application Priority Data

Nov. 12, 2008   (KR) ........................ 10-2008-0112330

(51) Int. Cl.
*G06F 1/26*     (2006.01)
*G06F 1/32*     (2006.01)

(52) U.S. Cl.
USPC ......................................................... 713/320

(58) Field of Classification Search
USPC .................................................. 713/300, 320
See application file for complete search history.

(56) References Cited

U.S. PATENT DOCUMENTS

| | | | |
|---|---|---|---|
| 6,966,006 B2* | 11/2005 | Pacheco et al. | 713/300 |
| 2003/0079150 A1* | 4/2003 | Smith et al. | 713/320 |
| 2008/0028246 A1* | 1/2008 | Witham | 713/330 |
| 2009/0204833 A1* | 8/2009 | Brown et al. | 713/323 |

* cited by examiner

*Primary Examiner* — Mohammed Rehman
(74) *Attorney, Agent, or Firm* — Jefferson IP Law, LLP

(57) ABSTRACT

An apparatus and a method for controlling power consumption in a system having a plurality of modems are provided. In the method, whether an interrupt is generated in each modem is detected. An amount of current consumption of the system at a processing point of the generated interrupt is determined. The amount of current consumption of the system is compared with a threshold, so that the processing point of the generated interrupt is controlled.

15 Claims, 5 Drawing Sheets

APPARATUS AND METHOD FOR CONTROLLING CURRENT CONSUMPTION IN A MULTI MODEM SYSTEM

PRIORITY

This application claims the benefit under 35 U.S.C. §119(a) of a Korean patent application filed in the Korean Intellectual Property Office on Nov. 12, 2008 and assigned Serial No. 10-2008-0112330, the entire disclosure of which is hereby incorporated by reference.

BACKGROUND OF THE INVENTION

1. Field of the Invention

The present invention relates to an apparatus and a method for controlling power consumption in a multi-modem system. More particularly, the present invention relates to an apparatus and a method for controlling power consumption by controlling a point at which an Interrupt Service Routine (ISR) is processed by a Central Processing Unit (CPU).

2. Description of the Related Art

Generally, a CPU performs an interrupt processing operation in cooperation with a relevant modem according to an ISR. At this point, each ISR is processed at a different point by the CPU depending on a generation point and this processing procedure is even more complicated in a system having a plurality of CPUs and a plurality of modems.

FIG. 1 is a schematic block diagram for ISR processing in a multi-modem system according to the conventional art. Recently, as electric/electronic and various communication technologies have been developed, a multi-modem system having a plurality of modems 120, 122, and 124, and a plurality of CPUs 100 and 102 is provided as illustrated in FIG. 1.

Referring to FIG. 1, in the system supporting the multi-modem and the multi-CPU, each modem informs relevant CPUs 100 and 102 of operations to be processed by the relevant CPUs 100 and 102 so that the respective CPUs 100 and 102 may perform corresponding operations by generating an ISR to Vectored Interrupt Controllers (VICs) 110 and 112. That is, each modem generates an ISR, each VIC analyzes the generated ISR and informs a relevant CPU 100 and 102 of a vector, which is a unique number of a relevant interrupt, and each CPU processes an operation corresponding to the interrupt using the vector.

FIG. 2 is a diagram illustrating current consumption according to ISR processing in a multi-modem system according to the conventional art.

Referring to FIG. 2, as each CPU of the system processes an operation corresponding to an ISR, an amount of current consumption increases. Therefore, when respective CPUs of the system process relevant ISRs at the same time, current consumption of the system may exceed a threshold. For example, when processing points of an ISR1 at two CPUs are similar to each other, entire current consumption 213 may exceed a peak current threshold 211 at processing points 201 and 203.

As described above, when the entire current consumption of the system exceeds the peak current threshold, a malfunction of the system may occur. Therefore, a technique for preventing the entire current consumption of the system from exceeding the peak current threshold is required.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for controlling power consumption in a multi-modem system.

Another aspect of the present invention is to provide an apparatus and a method for controlling power consumption by controlling a processing point of an Interrupt Service Routine (ISR) in a multi-modem system.

In accordance with an aspect of the present invention, a method for controlling power consumption in a system having a plurality of modems is provided. The method includes detecting, by an interrupt controller, whether an interrupt is generated in each modem, determining, by an Interrupt Service Routine (ISR) controller, an amount of current consumption of the system at a processing point of the generated interrupt, and comparing the amount of current consumption of the system with a threshold to control the processing point of the generated interrupt.

In accordance with another aspect of the present invention, an apparatus for controlling power consumption in a system having a plurality of modems is provided. The apparatus includes an interrupt controller for detecting whether an interrupt is generated in each modem, and an Interrupt Service Routine (ISR) controller for determining an amount of current consumption of the system at a processing point of the generated interrupt, and for comparing the amount of current consumption of the system with a threshold to control the processing point of the interrupt.

In accordance with another aspect of the present invention, an apparatus for controlling power consumption in a system having a plurality of modems is provided. The apparatus comprises a plurality of Vectored Interrupt Controllers (VICs), when an Interrupt Service Routine (ISR) is generated from one or more modems, for informing an ISR controller of the ISR generation, and the ISR controller for determining an amount of current consumption of the system at a processing point of the generated ISR, for comparing the amount of current consumption of the system with a threshold, and for providing a vector, which is a unique number of a relevant ISR, to a corresponding CPU, wherein the ISR controller controls a point at which one or more CPUs perform an operation corresponding to an ISR by controlling a point for providing a vector of the ISR to a corresponding CPU.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and a method for estimating current consumption depending on ISR processing in advance and controlling a processing point of the ISR in a multi-modem system.

Figure 1:
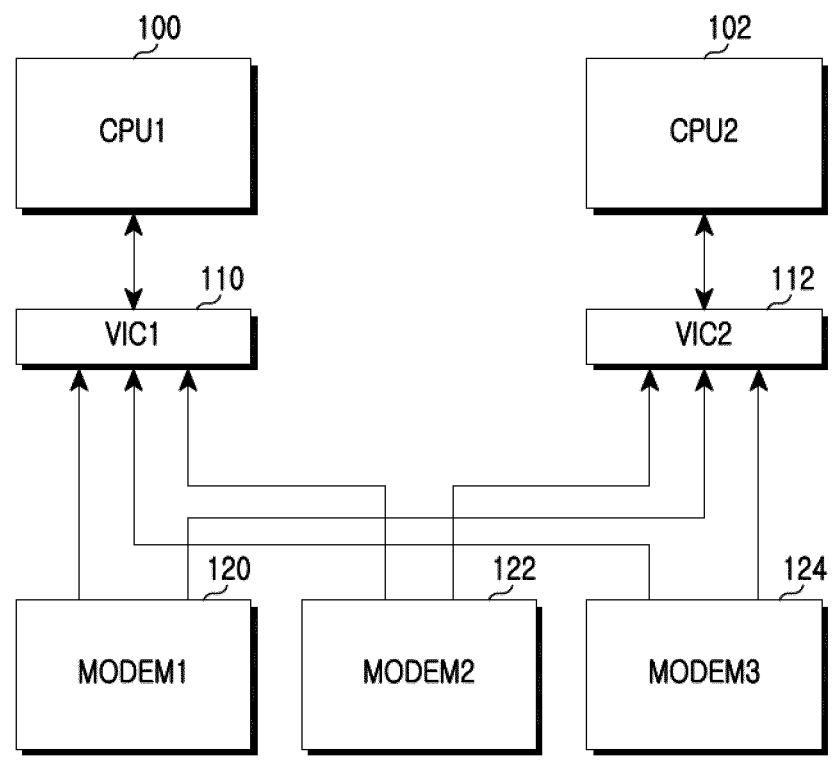
FIG. 1 is a schematic block diagram for ISR processing in a multi-modem system according to the conventional art.
Figure 2:
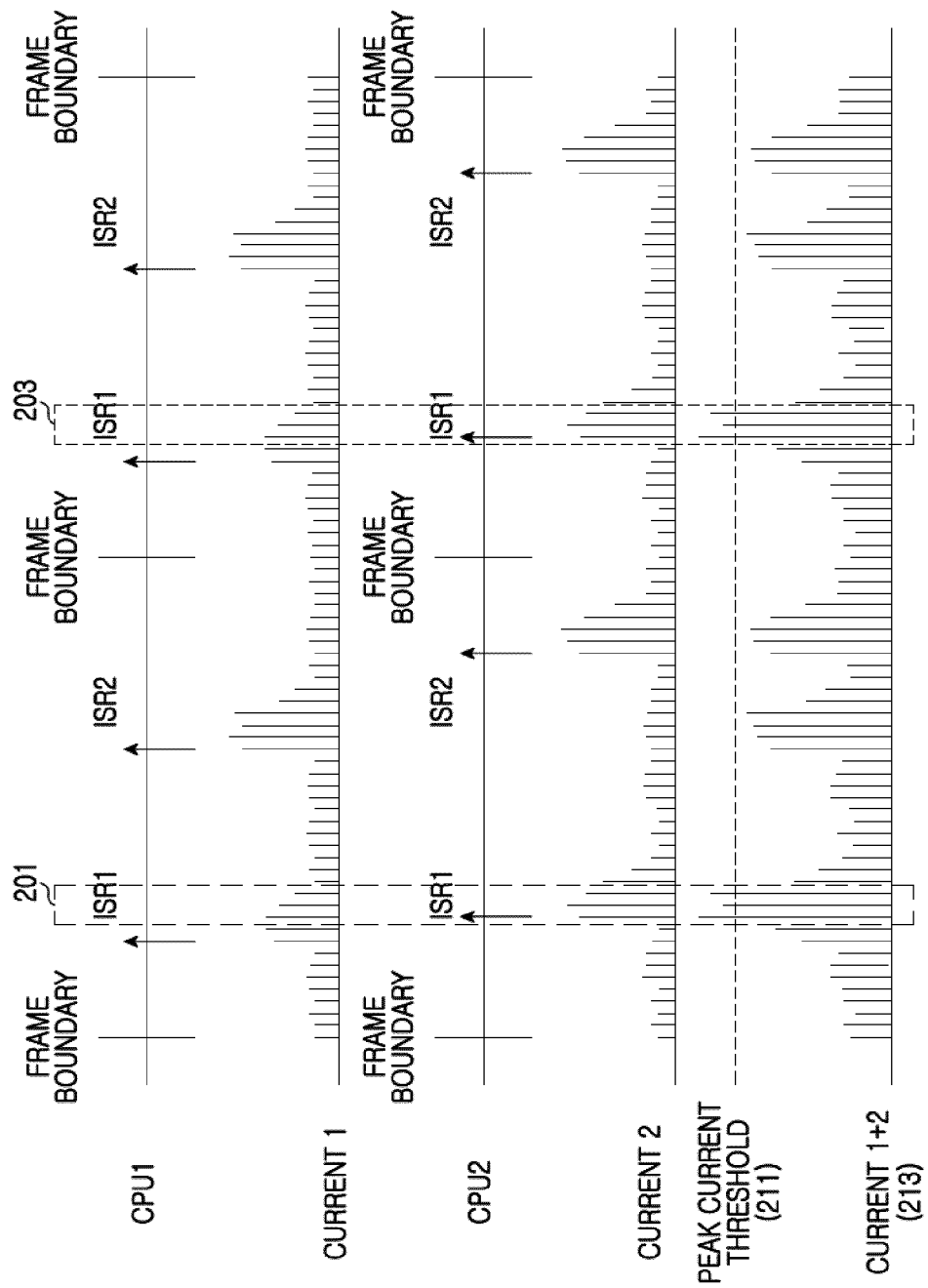
FIG. 2 is a diagram illustrating current consumption according to ISR processing in a multi-modem system according to the conventional art.
Figure 3:
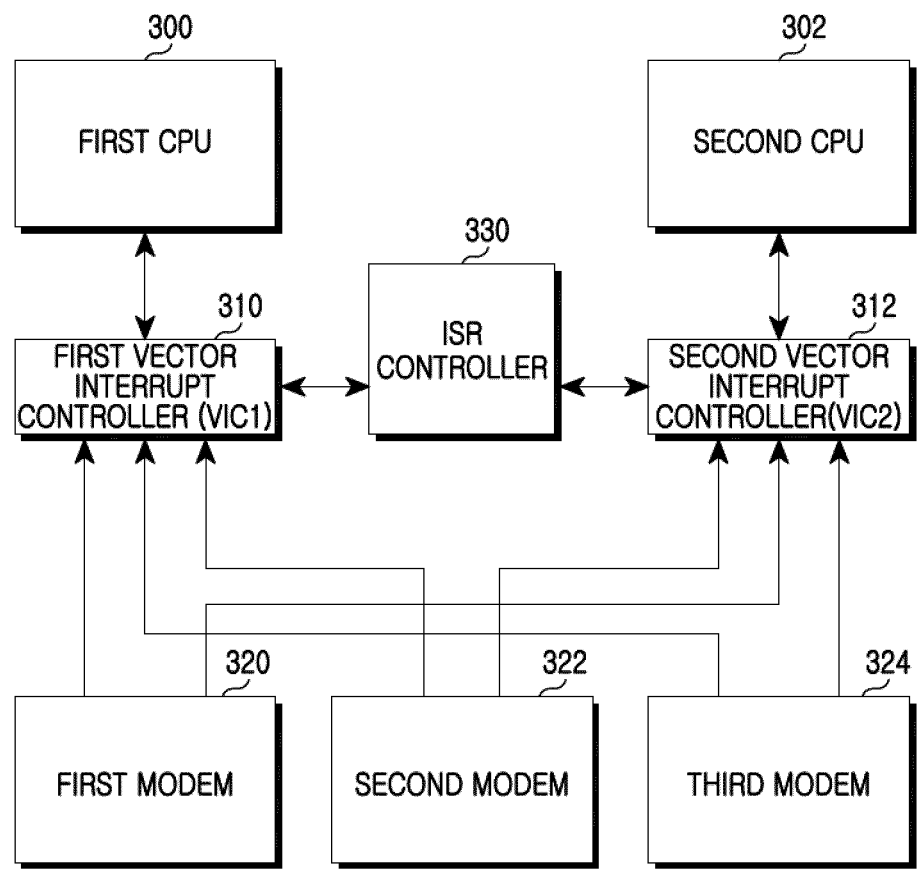
FIG. 3 is a block diagram illustrating a multi-modem system according to an exemplary embodiment of the present invention.

FIG. 3 is a block diagram illustrating a multi-modem system according to an exemplary embodiment of the present invention.

Referring to FIG. 3, the multi-modem system includes a first CPU 300, a second CPU 302, a first VIC (VIC1) 310, a second VIC (VIC2) 312, an ISR controller 330, a first modem 320, a second modem 322, and a third modem 324.

The first and second CPUs 300 and 302 process and control overall operations of the system. When a vector, which is a unique number of a specific interrupt, is provided from the first and second VICs 310 and 312, the first and second CPUs 300 and 302 perform operations corresponding to the vector, respectively.

The first and second VICs 310 and 312 analyze an ISR generated by the first, second, and third modems 320, 322, and 324 to determine a vector, which is a unique number of a relevant interrupt, and provide the determined vector to the corresponding CPUs 300 and 302. More particularly, according to an exemplary embodiment of the present invention, when an ISR is generated by each modem, the first and second VICs 310 and 312 inform the ISR controller 330 of the ISR generation, and control a point at which the CPUs 300 and 302 perform an operation corresponding to the ISR by controlling a point for providing a vector of the ISR to the relevant CPUs 300 and 302 under the control of the ISR controller 330.

According to an exemplary embodiment of the present invention, the ISR controller 330 is informed of the ISR generation by the first and second VICs 310 and 312, and determines an amount of current to be consumed while each CPU processes the generated ISR to determine whether the amount of current exceeds a threshold. If it is determined that the determined amount of current consumption exceeds the threshold, the ISR controller 330 controls a processing point of the ISR to be processed by the first CUP 300 or the second CPU 302 through the VICs 310 and 312. At this point, the ISR controller 330 determines an amount of current consumption caused by the generated ISR by tabulating an amount of current consumption caused by ISR processing of each CPU at each time inside a frame serving as a reference and storing a table in a memory (not shown) in advance.

Table 1 represents an amount of current consumption for each ISR of the first and second CPUs.

TABLE 1

| CPU1 | ISR1 | ISR2 | CPU2 | ISR1 | ISR2 |
|---|---|---|---|---|---|
| Element 1 | 10 | 15 | Element 1 | 10 | 10 |
| Element 2 | 5 | 10 | Element 2 | 15 | 15 |
| Element 3 | 15 | 20 | Element 3 | 20 | 20 |
| Sum | 30 | 45 | Sum | 45 | 45 |

In Table 1, Element 1, Element 2, and Element 3 are devices operating while the ISR is processed, and may be CPUs, modems, Radio Frequency (RF) devices, or analog devices. That is, Elements of Table 1 may include devices operating and consuming current while the ISR is processed, and all devices operating in an aspect of system operation and consuming current regardless of ISR processing.

Table 1 represents an amount of current consumed at each device while ISR1 or ISR2 is processed. For example, in the case where the CPU1 processes ISR1, the Element 1, the Element 2, and the Element 3 consume currents corresponding to 10, 5, and 15, so that current corresponding to a total of 30 is consumed while ISR1 is processed.

The first, the second, and the third modems 320, 322, and 324 generate ISRs depending on operations to be processed by respective CPUs 300 and 302, and provide the generated ISRs to the relevant VICs 310 and 312.

Figure 4:
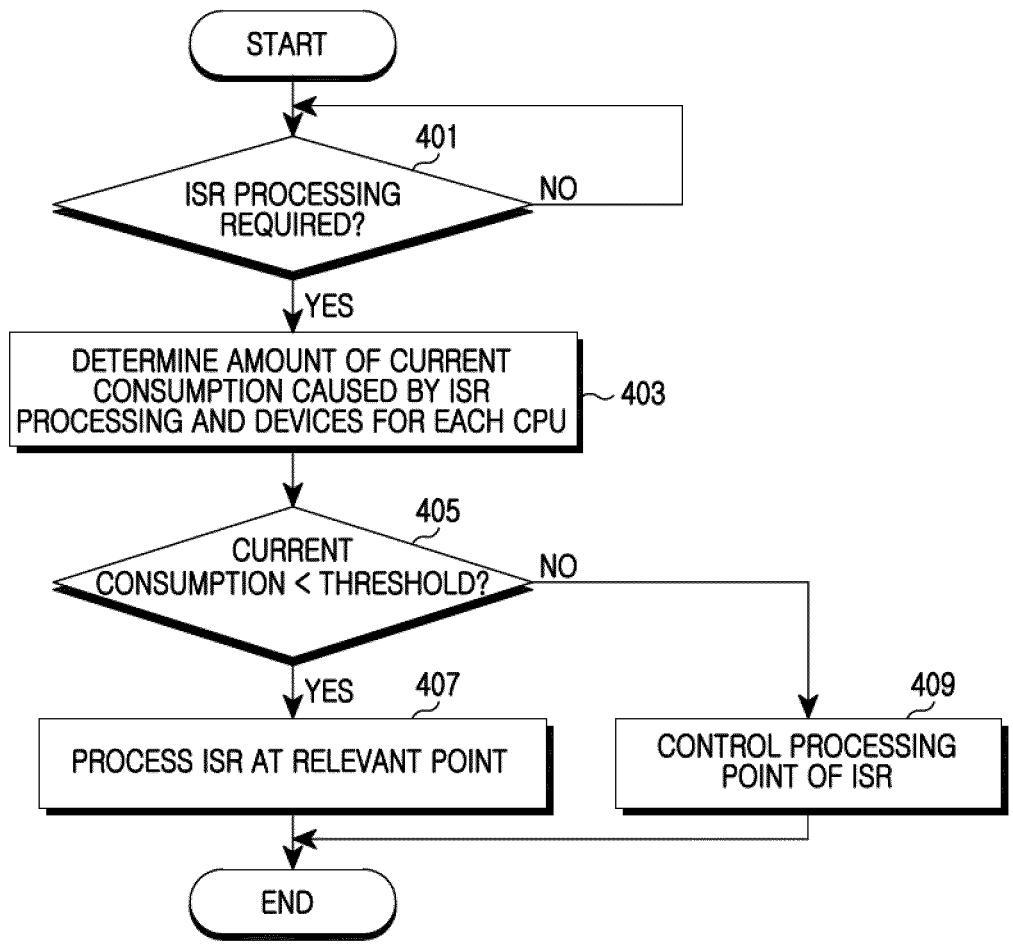
FIG. 4 is a view illustrating an operation procedure of a multi-modem system according to an exemplary embodiment of the present invention.

FIG. 4 is a view illustrating an operation procedure of a multi-modem system according to an exemplary embodiment of the present invention.

Referring to FIG. 4, the system starts a new frame operation and determines whether a new ISR is generated and processing thereof is required in step 401. If it is determined in step 401 that the new ISR is generated and the processing thereof is required, the system determines an amount of current consumption caused by the processing of the generated ISR for each CPU in step 403. For example, when the ISR1 is generated for the CPU1 and the CPU2 at a similar point, the system may determine a total amount of current consumption as 75 because Table 1 shows that the CPU1 and the CPU2 consume currents corresponding to 30 and 45, respectively, when processing the ISR1. This determination is also applied to the case where ISR1 is generated to the CPU2 while the CPU1 processes the ISR1 in the system.

The system determines whether the determined amount of current consumption is less than a threshold in step 405. Here, the threshold is an amount of current consumption allowable by the system and may be obtained through experiments.

If it is determined in step 405 that the determined amount of the current consumption is less than the threshold, the system processes the generated ISR at a point at which the ISR is to be processed originally in step 407. For example, when the threshold is 65, the ISR2 is generated to the CPU1, and no ISR is generated to the CPU2, the system may determine that a total amount of current consumption is 45 and this value is less than the threshold because Table 1 shows the CPU1 consumes current corresponding to 45 when processing the ISR2.

In contrast, if it is determined in step 405 that the determined amount of the current consumption is equal to or greater than the threshold, the system controls a processing point of the generated ISR in step 409. Here, the system changes the processing point of the ISR to a point at which a total amount of current consumption does not exceed the threshold while processing the ISR.

Figure 5:
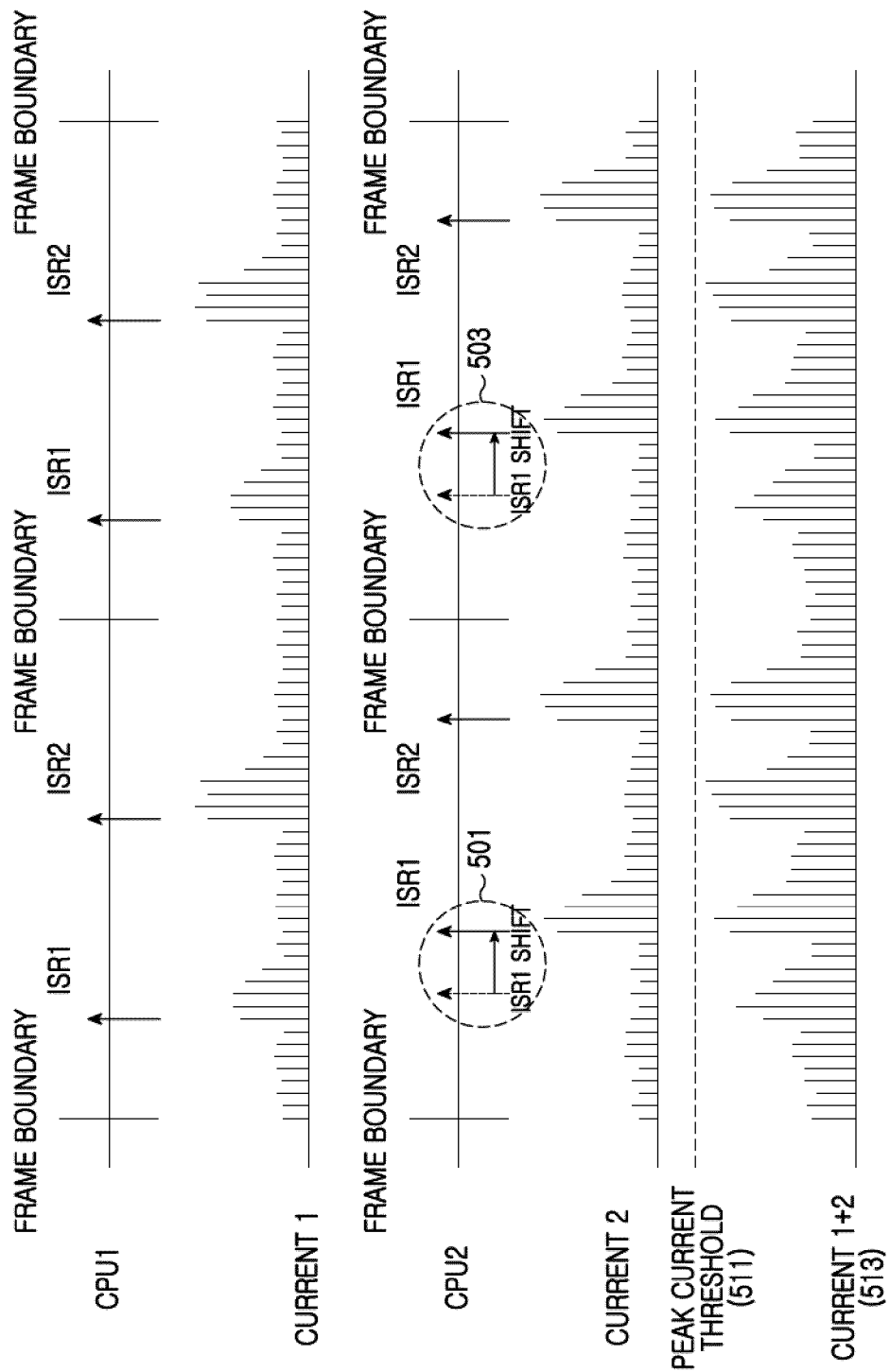
FIG. 5 is a diagram illustrating control of an ISR processing point at a multi-modem system according to an exemplary embodiment of the present invention.

FIG. 5 is a diagram illustrating control of an ISR processing point at a multi-modem system according to an exemplary embodiment of the present invention.

Referring to FIG. 5, when the ISR1 is generated for the CPU1 and the CPU2, the total current amount 513 consumed by the system becomes 75 and thus exceeds a peak current threshold 511 which is 65. In this case, the system may change points at which the CPU2 processes the ISR1 to other points, for example processing points 501 and 503. At this point, the system may change the processing point so that the CPU2 stands by until processing of the ISR1 by the CPU1 terminates and the CPU2 processes the ISR1. Alternatively, the system may search for a point at which an amount of current consumption of the system does not exceed the threshold even when the CPU2 processes the ISR1, and change the processing point to a found point.

After that, the system ends the algorithm according to an exemplary embodiment of the present invention.

Exemplary embodiments of the present invention may prevent an amount of current consumption of an entire system from exceeding a peak current threshold in the case where a plurality of modems and a plurality of CPUs operate simultaneously, and thus allow the system to stably operate by estimating in advance current consumption caused by ISR processing and controlling a processing point of the ISR in a multi-modem system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling power consumption in a system having a plurality of modems, the method comprising:
   detecting, by an interrupt controller, at least one interrupt for a plurality of Central Processing Units (CPUs) generated from the plurality of modems;
   determining, by an Interrupt Service Routine (ISR) controller, an amount of current consumption of the system at a processing point of the generated interrupt;
   comparing the amount of current consumption of the system with a threshold; and
   controlling the processing point of a relevant interrupt to be processed in each CPU by controlling a point for providing information of the relevant interrupt to each CPU based on a result of the comparison.

2. The method of claim 1, wherein the controlling of the processing point of the generated interrupt comprises:
   when the amount of current consumption of the system is less than the threshold, processing the relevant interrupt by each CPU at a same time by maintaining the point for providing information of the relevant interrupt to each CPU; and
   when the amount of the current consumption of the system is equal to or greater than the threshold, processing the relevant interrupt by each CPU at a different time point by changing the point for providing information of the relevant interrupt to each CPU.

3. The method of claim 2, wherein the changing of the point for providing information of the relevant interrupt to each CPU comprises changing the processing point of at least one CPU to a point at which the amount of current consumption of the system, while the relevant interrupt is processed by each CPU, is less than the threshold.

4. The method of claim 1, wherein the amount of current consumption is determined using an amount of current consumption of devices operating when a modem corresponding to the generated interrupt processes the generated interrupt, and an amount of current consumption of devices operating when the system operates.

5. The method of claim 1, wherein the amount of current consumption is determined with reference to a table representing current consumption of devices operating when each modem processes each interrupt.

6. An apparatus for controlling power consumption in a system having a plurality of modems, the apparatus comprising:
   an interrupt controller for detecting at least one interrupt for a plurality of Central Processing Units (CPUs) generated from the plurality of modems; and
   an Interrupt Service Routine (ISR) controller for determining an amount of current consumption of the system at a processing point of the generated interrupt, for comparing the amount of current consumption of the system with a threshold, and for controlling the processing point of a relevant interrupt to be processed in each CPU by controlling a point of providing information of the relevant interrupt to each CPU based on a result of the comparison.

7. The apparatus of claim 6, wherein when the amount of the current consumption of the system is less than the threshold, the ISR controller processes the relevant interrupt by each CPU at a same time by maintaining the point for providing information of the relevant interrupt to each CPU, and when the amount of the current consumption of the system is equal to or greater than the threshold, the ISR controller processes the relevant interrupt by each CPU at a different time point by changing the point for providing information of the relevant interrupt to each CPU.

8. The apparatus of claim 7, wherein the ISR controller changes the providing point of the relevant interrupt of at least one CPU to a point at which the amount of current consumption of the system, while the relevant interrupt is processed by each CPU, is less than the threshold.

9. The apparatus of claim 6, wherein the ISR controller determines the amount of current consumption using an amount of current consumption of devices operating when a modem corresponding to the generated interrupt processes the generated interrupt, and an amount of current consumption of devices operating when the system operates.

10. The apparatus of claim 6, wherein the ISR controller determines the amount of current consumption with reference to a table representing current consumption of devices operating when each modem processes each interrupt.

11. An apparatus for controlling power consumption in a system having a plurality of modems, the apparatus comprising:
   a plurality of Vectored Interrupt Controllers (VICs), when at least one Interrupt Service Routine (ISR) for a plurality of Central Processing Units (CPUs) is generated from one or more modems, for informing an ISR controller of the ISR generation; and the ISR controller for determining an amount of current consumption of the system at a processing point of the generated ISR, for comparing the amount of current consumption of the system with a threshold, and for providing a vector, which is a unique number of a relevant ISR, to a corresponding CPU, wherein the ISR controller controls a point at which one or more CPUs perform an operation corresponding to an ISR by controlling a point for providing a vector of the ISR to a corresponding CPU.

12. The apparatus of claim 11, wherein the controlling of the point for providing the vector of the ISR comprises:

when the amount of current consumption of the system is less than the threshold, processing a relevant interrupt by each CPU at a same time by maintaining the point for providing the vector of the ISR to the corresponding CPU; and when the amount of the current consumption of the system is equal to or greater than the threshold, processing the relevant interrupt by each CPU at a different time point by changing the point for providing the vector of the ISR to the corresponding CPU.

13. The apparatus of claim 12, wherein the changing the point for providing the vector of the ISR to the corresponding CPU comprises changing the point for providing the vector of the ISR to the corresponding CPU, at which the amount of current consumption of the system is less than the threshold.

14. The apparatus of claim 11, wherein the amount of current consumption is determined using an amount of current consumption of devices operating when a modem corresponding to the generated ISR processes the generated ISR, and an amount of current consumption of devices operating when the system operates.

15. The apparatus of claim 11, wherein the amount of current consumption is determined with reference to a table representing current consumption of devices operating when each modem processes each ISR.

\* \* \* \* \*